(12) United States Patent
Emmot et al.

(10) Patent No.: US 7,629,979 B2
(45) Date of Patent: Dec. 8, 2009

(54) SYSTEM AND METHOD FOR COMMUNICATING INFORMATION FROM A SINGLE-THREADED APPLICATION OVER MULTIPLE I/O BUSSES

(75) Inventors: Darel N. Emmot, Fort Collins, CO (US); Byron A. Alcorn, Fort Collins, CO (US); Ronald D. Larson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1376 days.

(21) Appl. No.: 10/644,215

(22) Filed: Aug. 20, 2003

(65) Prior Publication Data

US 2005/0044288 A1 Feb. 24, 2005

(51) Int. Cl.
*G06F 15/16* (2006.01)
*G06F 15/80* (2006.01)
*G06F 12/02* (2006.01)
*G06F 13/14* (2006.01)

(52) U.S. Cl. .................... 345/520; 345/502; 345/505; 345/543

(58) Field of Classification Search ......... 345/501–506, 345/520, 531, 536, 543, 558; 710/305–315
See application file for complete search history.

(56) References Cited

U.S. PATENT DOCUMENTS

| | | | |
|---|---|---|---|
| 4,958,302 A | 9/1990 | Fredrickson et al. | |
| 4,965,716 A | 10/1990 | Sweenet | |
| 4,975,833 A | 12/1990 | Jinzaki | |
| 5,131,080 A | 7/1992 | Fredrickson et al. | |
| 5,448,698 A * | 9/1995 | Wilkes | 709/245 |
| 5,657,479 A | 8/1997 | Shaw et al. | |
| 5,696,533 A | 12/1997 | Montgomery et al. | |
| 5,838,334 A | 11/1998 | Dye | |
| 5,917,505 A | 6/1999 | Larson | |
| 5,920,326 A * | 7/1999 | Rentschler et al. | 345/503 |
| 5,951,672 A * | 9/1999 | Kwok et al. | 712/28 |
| 6,057,851 A | 5/2000 | Luken et al. | |
| 6,106,468 A | 8/2000 | Dowdell | |
| 6,108,007 A | 8/2000 | Shochet | |
| 6,181,346 B1 * | 1/2001 | Ono et al. | 345/582 |
| 6,232,974 B1 | 5/2001 | Horvitz et al. | |
| 6,292,200 B1 * | 9/2001 | Bowen et al. | 345/506 |
| 6,311,247 B1 * | 10/2001 | Spencer | 710/307 |
| 6,377,257 B1 * | 4/2002 | Borrel et al. | 345/419 |
| 6,384,833 B1 * | 5/2002 | Denneau et al. | 345/522 |
| 6,725,296 B2 * | 4/2004 | Craddock et al. | 710/52 |
| 6,762,763 B1 * | 7/2004 | Migdal et al. | 345/506 |
| 6,771,269 B1 * | 8/2004 | Radecki et al. | 345/503 |
| 6,801,202 B2 * | 10/2004 | Nelson et al. | 345/505 |
| 6,819,325 B2 * | 11/2004 | Boyd et al. | 345/559 |
| 6,885,376 B2 * | 4/2005 | Tang-Petersen et al. | 345/506 |
| 6,924,807 B2 * | 8/2005 | Ebihara et al. | 345/503 |

* cited by examiner

*Primary Examiner*—Hau H Nguyen

(57) ABSTRACT

A system and method communicate information from a single-threaded application over multiple I/O busses to a computing subsystem for processing. In accordance with one embodiment, a method is provided that partitions state-sequenced information for communication to a computer subsystem, communicates the partitioned information to the subsystem over a plurality of input/output busses, and separately processes the information received over each of the plurality of input/output busses, without first se-sequencing the information.

16 Claims, 3 Drawing Sheets

SYSTEM AND METHOD FOR COMMUNICATING INFORMATION FROM A SINGLE-THREADED APPLICATION OVER MULTIPLE I/O BUSSES

BACKGROUND

There is an ever-present need for enhanced performance of computing systems. Increasing computational intensity of higher-level software applications is a driving factor for the need to provide faster and more efficient lower-level computing systems for carrying out the computations. Consider, for example, the computing system shown in FIG. 1. The system illustrates a host computer 110 and a computing subsystem 120. The subsystem 120 may be any of a variety of subsystems that are utilized to assist in the computation or execution of applications and programs that are being executed by the host computer 110.

As a particular illustration, in many situations, a host computer 110 executes a single-threaded application (STA) 112, which consists of a linear sequence of state-sequenced instructions. These instructions are often arranged in a command buffer 114 in linear fashion for communication to a subsystem 120 for processing. Frequently, the communication mechanism for communicating the state-sequenced information from the host computer 110 to the subsystem 120 includes a direct memory access (DMA) transfer. As is known, there are tradeoffs involved in structuring DMA transfers of this nature. In this regard, as larger amounts of data are grouped for the DMA transfer, then longer periods of time pass in which the subsystem 120 may remain idle, while it is awaiting receipt of the data. Conversely, if the data is broken up into many smaller chunks or segments, then more overhead is expended in setting up and taking down the DMA transfers. Strategies and methods for balancing these tradeoffs and implementing such DMA transfers are well known.

In many systems, a bottleneck occurs between the host computer 110 and the subsystem 120 (or 130), where the bandwidth on the communication channel between the host computer and subsystem is smaller than the respective bandwidths or processing capabilities of the host computer and subsystem. In this regard, DMA transfers to a subsystem are often limited by the bandwidth provided by industry standard interfaces, such as PCI (peripheral component interconnect) or AGP (accelerated graphics port).

Accordingly, there is a desire to provide improved systems having enhanced performance to overcome these and other shortcomings of the prior art.

SUMMARY

Embodiments of the present invention are broadly directed to systems and methods for communicating information from a single-threaded application over multiple I/O busses to a computing subsystem for processing. In one embodiment, a method is provided that partitions state-sequenced information for communication to a computer subsystem, communicates the partitioned information to the subsystem over a plurality of input/output busses, and separately processes the information received over each of the plurality of input/output busses, without first re-sequencing the information.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

As summarized above, embodiments of the present invention are directed to systems and methods for communicating information from a single-threaded application to a computing subsystem over multiple I/O (input/output) buses. It is observed that the bandwidth available in the a host computer random access memory (RAM) subsystem and the aggregate bandwidth available across all of its I/O interfaces, is typically several factors higher than, for example, the bandwidth of a peripheral component interconnect (PCI) or accelerated graphics port (AGP) bus. For instance, an I/O slot may have 1 GB/s bandwidth, while the memory has 12 GB/s bandwidth. The ability to utilize industry standard interfaces and provide a scalable set of products are benefits that are realized by embodiments of the invention.

It should be appreciated that the concepts and features of the present invention are applicable to a wide variety of computing subsystems. A graphics subsystem is one example of such a computing subsystem.

Figure 1:
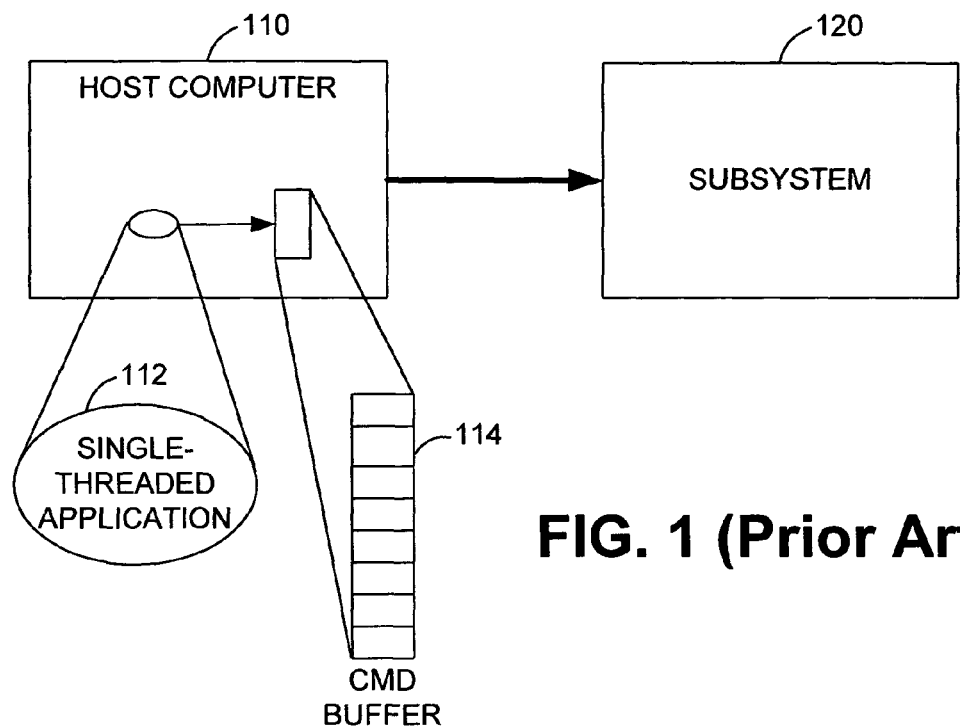
FIG. 1 is a block diagram illustrating a host computer and a computing subsystem, as is known in the prior art.
Figure 2:
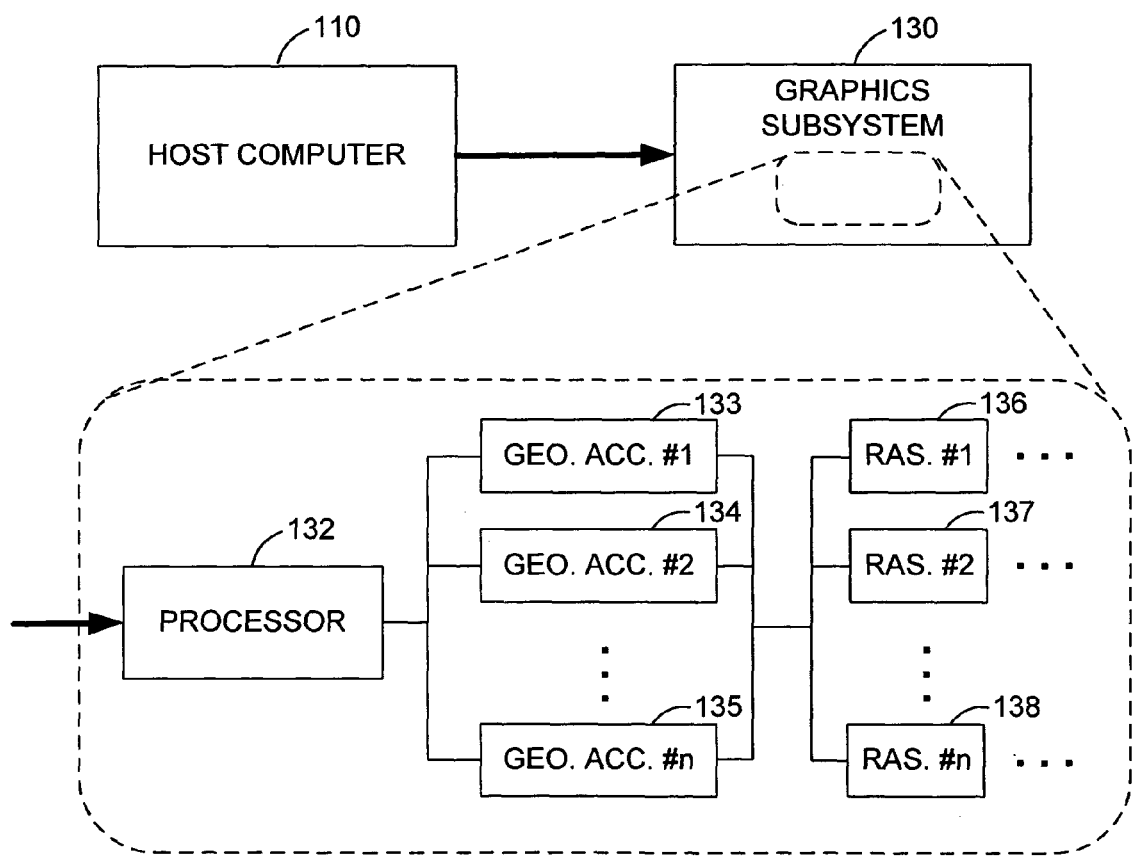
FIG. 2 is a block diagram particularly illustrating a computing subsystem as a graphics subsystem.

Reference is made to FIG. 2, which illustrates a computing system similar to FIG. 1, wherein the subsystem 130 is a graphics subsystem. As is known by persons in the art, graphics subsystems include a number of components, many of which are not illustrated in FIG. 2. Generally illustrated in FIG. 2 is a processor 132, which receives the incoming data communicated from the host computer 110. In the particular embodiment illustrated in FIG. 1B, the graphics subsystem 130 includes multiple geometry accelerators 133, 134, and 135, as well as multiple rasterizers 136, 137, and 138. The graphic system may utilize multiple geometry accelerators and rasterizers in parallel fashion, to enhance the processing of graphics data and information for visual presentation on a computer screen. In such graphic systems, data received by the processor 132 is allocated among the various geometry accelerators and other graphics system components for processing.

Figure 3:
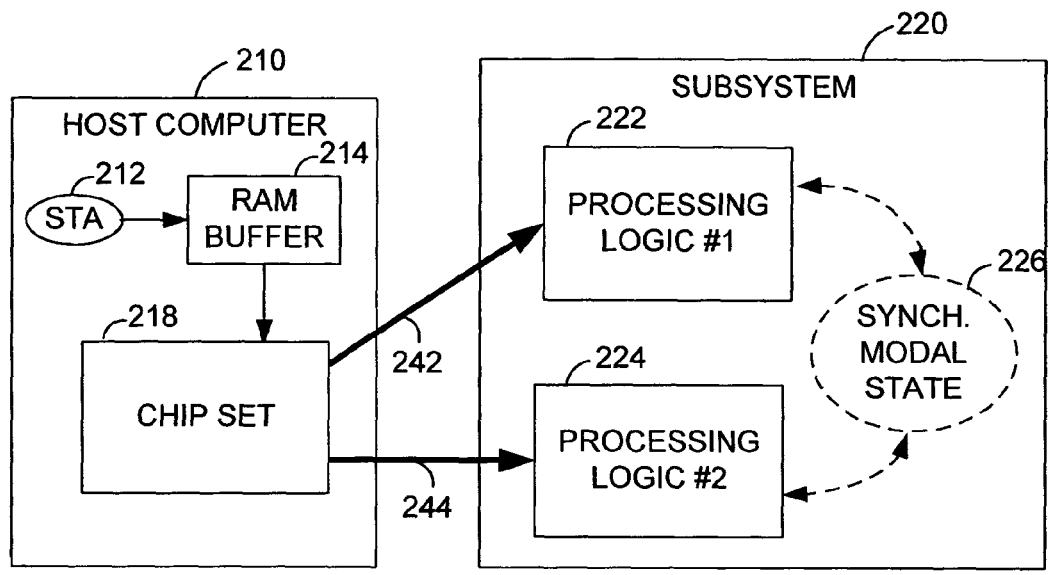
FIG. 3 is a block diagram illustrating an embodiment of the present invention.

In this regard, reference is made to FIG. 3, which is a block diagram, illustrating one embodiment of the present invention. In this embodiment, host computer 210 may be configured to execute a single-threaded application 212. Information from such a single-threaded application 212 may be communicated to a subsystem 220 for processing, by directing the information through a command buffer or RAM buffer 214. Typically, the data or information communicated through the RAM buffer 214 is in state-sequenced, linear order. In contrast to known systems, which communicate data from the RAM buffer to the subsystem over a single I/O bus, embodiments of the present invention communicate the data to the subsystem 220 over a plurality of I/O buses 242 and 244. To facilitate this, the system of FIG. 3 may include a chipset 218, interfacing between the single-threaded application 212 and RAM buffer 214 and the subsystem 220.

It should be appreciated that the single-threaded application element 212 is a logical, as opposed to physical, representation. Indeed, a processor may be in communication with the RAM buffer 214 via the chipset 218 rather than directly. Further, RAM control may be integrated directly on the processor chip, with I/O accessing RAM via an interface on the chip.

The computing subsystem 220 includes processing logic for carrying out the intended computations or processing on the information that is communicated from the host computer 210. Rather than a single processing logic block, FIG. 3 illustrates multiple processing logic blocks 222 and 224. Indeed, there will be at least one node or processing logic block for each I/O bus. Further, it should be appreciated that the degraded performance resulting from the bandwidth bottleneck of the single I/O bus of existing systems is substantially overcome by the bandwidth enhancements obtained through the use of multiple I/O buses in connection with systems and methods constructed in accordance with the teachings of the present invention.

In addition to the processing logic elements 222 and 224, an element 226 is provided for maintaining the synchronization of the modal state of the information being processed in the respective processing logic blocks 222 and 224. This synchronization of modal state element 226 is illustrated in dash-lines to represent that it may be implemented as a separate element, or alternatively may be integrated into the plurality of processing logic elements 222 and 224.

As noted above, the information communicated from a single-threaded application 212 is state-sequenced information and is processed in a serial fashion. In order to ensure proper execution and operation of the single-threaded application by the subsystem 220, a mechanism within the subsystem 220 ensures that the information that is processed by the distinct processing logic blocks operates to maintain accurate state.

By way of illustration, consider conceptually one megabyte of information from the host computer 210 that is to be communicated to the subsystem 220 for processing. For simplicity, assume that the partition logic splits the information of a single DMA from the single-threaded application in half, such that the first 500 kilobytes is communicated across I/O bus 242 to processing logic 222, while the second 500 kilobytes is communicated across I/O bus 244 to processing logic 224. Using two I/O buses essentially enables the bandwidth over the communication channel between the host computer 210 and subsystem 220 to be double. One approach on the subsystem side 220 would be to receive the data over the respective I/O communication channels 242 and 244 and re-serialize the data for processing within the subsystem 220. Once the information is re-serialized, it may be processed by components in the subsystem 220 in ways that are known. However, and as will be further described below, in embodiments of the invention the information may be operated upon with re-serializing the entirety of the information.

Consequently, it should be appreciated that embodiments of the present invention may be implemented in a variety of architectural environments. Specifically, a variety of mechanisms and methods may be implemented to communicate information from a single-threaded application to a computing subsystem across multiple I/O busses, so long as the computing system is able to ascertain or recover needed state information, so that instructions may be executed by the computing subsystem in proper order. One such environment is that described in co-pending application Ser. No. 10/109, 829 (entitled "A System And Method For Passing Messages Among Processing Nodes In A Distributed System"), filed on Mar. 29, 2002, which is incorporated by reference herein. As described therein, the environment is characterized by a nodal architecture, which enables processing functionality to be distributed among a variety of processing nodes, which are coupled through a communication network.

The operation of the processing nodes of that system are managed through the implementation of work queues at the nodes, and the passing of messages among the various nodes. Such a message-passing feature and queue-based work management is one embodiment that may be utilized to coordinate the processing of information originating from a single-threaded application, without having to first re-serialize the information. Thus, information originating from a single-threaded application running on a host computer may be partitioned and communicated across multiple I/O busses, and received by separate nodes in a nodal architecture. Intercommunication among the receiving nodes may be utilized to maintain proper modal state and synchronize the functional operation of the application.

One approach may be implemented by a work queue of state update information to be created at the end of each DMA partition. This work queue could be provided to the appropriate agent(s) to be processed prior to any work queues for subsequent DMA partitions. This may be implemented similar to the synchronization strategies described in the above-referenced co-pending application. It will be appreciated that this synchronization among the processing logic elements may be implemented in a variety of ways, consistent with the scope and spirit of the invention.

With regard to the modal state synchronization, it should be appreciated that the DMA operation is initiated by the subsystem 220 (that is, in a DMA operation, the subsystem 220 operates to "pull" information from the host, as opposed to the host operating to "push" information to the subsystem 220). Consequently, information about the requested DMA may be known and shared as appropriate among the nodes of the subsystem 220. Thus, when partitioned data is received (in response to a DMA) over an I/O bus at processing logic 222, 224, the processing logic can utilize work queues to and message passing to insure modal synchronization. Specific implementation of this modal synchronization may vary among embodiments and the mechanism and reason for the requested DMA.

As the synchronization information is typically a small amount of information, it could be processed at the next host interface agent or could be processed at the next geometry accelerator (or other functional unit) without adversely impacting utilization of the nodal communication network. The decision may depend on provisioning of buffering among the different node types. In one embodiment, sufficient memory may be available at the host interface agent, so it would be preferable to buffer a work queue at the intended geometry accelerator (or other functional unit) until the needed synchronization work queue is available to process the work queues.

As an example for a computer graphics system, consider the following segment of OpenGL code:

GLColor Red
... (primitive 1)
... (primitive 2)
GLColor Blue
... (primitive 3)
... (primitive 4)

All primitives (e.g., primitives 1 and 2) rendered between the GLColor Red command and the GLColor Blue commands are to be rendered in the color red. Suppose, however, that the command stream is segmented (at the host computer)

between the commands defining primitives 1 and 2, and that the segmented streams are communicated from the host computer to a graphics subsystem over separate I/O busses. It will be important for the graphics system to maintain the proper modal state, so that both primitives 1 and 2 are rendered in the color red.

A structure such as that described in the above-referenced co-pending application is one example of a structure or implementation that effectively ensures that the state information is preserved, even though it may be partitioned and communicated across multiple I/O busses.

Figure 4:
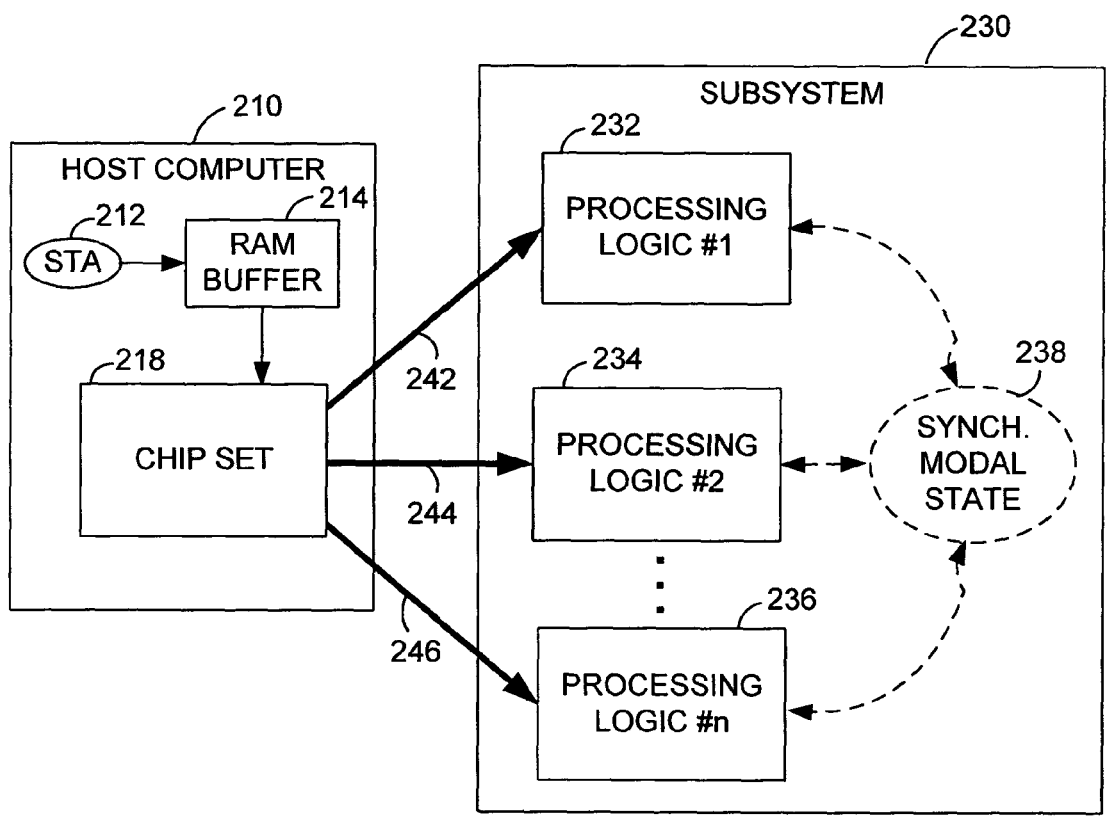
FIG. 4 is a block diagram illustrating an alternative embodiment of the present invention.

Having described one embodiment of the present invention, reference is made to FIG. 4, which is a diagram illustrating an embodiment, similar to the embodiment of FIG. 3 but having three I/O buses 242, 244, and 246. The chip set 218 in the embodiment of FIG. 3 may be configured to partition the state-sequenced information contained within the RAM buffer 214 for communication over the n I/O buses (where n is an integer). Likewise, there are n processing blocks 232, 234, and 236. FIG. 4 is provided to illustrate the scalability and expandability of the concept of the present invention, which enables additional I/O buses to minimize bandwidth limitations or degradations over the communication channel between the host computer and subsystem.

In yet another embodiment, not specifically illustrated, the single-threaded application may have knowledge of the multiple I/O busses. In such a system, the single-threaded application may contain logic to partition the data to be communicated over the plurality of I/O busses.

Figure 5:
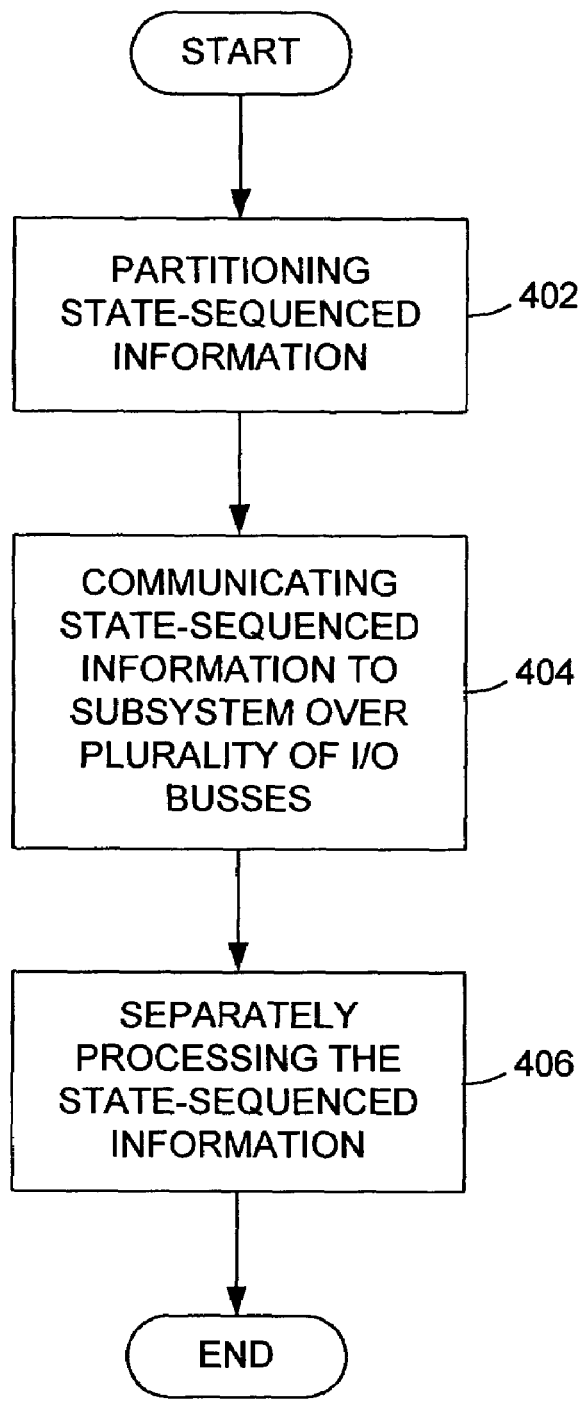
FIG. 5 is a flowchart illustrating the top-level functional operation of an embodiment of the present invention.

Embodiments of the present invention are also directed to methods for communicating information from a single-threaded application to a computing subsystem over multiple I/O buses. Reference is made to FIG. 5, which is a flowchart illustrating the top-level operation of one such method. In one embodiment, a method is provided that begins by partitioning state-sequenced information (i.e., instructions or information from a single-threaded application) into segments for communication over multiple I/O buses (block 402). Thereafter, the method communicates the state-sequenced information to a subsystem over a plurality of I/O buses (block 404). Thereafter, the method separately processes the state-sequenced information at the computing subsystem (block 406). As described above, the processing of the state-sequenced information includes, implicitly, maintaining the integrity of the state-sequenced information, such that the processing performed by the subsystem is performed in an order-dependent fashion.

It should be appreciated that features of embodiments of the invention may be embodied in hardware may be embodied in a program. A program may comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

What is claimed is:

1. A method comprising:
   partitioning state-sequenced information for communication to a computer subsystem;
   communicating the partitioned information to the subsystem over a plurality of input/output busses; and
   separately processing partitioned information received over each of the plurality of input/output busses, without first re-sequencing the information.

2. The method of claim 1, wherein the separately processing further comprises obtaining state information from the received information, and processing the information in a proper state context.

3. The method of claim 1, wherein the communicating partitioned state-sequenced information comprises performing at least one direct memory access (DMA) across each of the plurality of input/output busses.

4. The method of claim 1, wherein the communicating partitioned state-sequenced information comprises communicating the information over a peripheral component interface (PCI) bus.

5. The method of claim 1, wherein the information includes graphics information and the separately processing comprises performing graphics processing on the partitioned information.

6. The method of claim 1, wherein separately processing comprises performing an independent rendering on information received on each of the plurality of busses.

7. A computer system comprising:
   a host processor configured to execute a single-threaded application;
   partitioning logic for partitioning state-sequenced information,
   communication logic configured to communicate partitioned state-sequenced information across a plurality of input/output busses;
   a plurality of interfaces located at a subsystem for receiving the information communicated across the plurality of the input/output busses;
   processing logic for controlling the processing of the partitioned information without re-sequencing the information, the processing logic configured to preserve state information of the information processed.

8. The system of claim 7, further comprising a buffer memory in communication with the host processor for storing state-sequenced information for communication to a subsystem.

9. The system of claim 7, wherein the processing logic is located at the subsystem.

10. The system of claim 7, wherein the partitioning logic is located in at the subsystem.

11. The system of claim 7, wherein the partitioning logic is located in at the at the host processor.

12. The system of claim 7, wherein the processing logic comprises at least one geometry accelerator.

13. The system of claim 7, wherein each of the input/output busses are peripheral component interface (PCI) busses.

14. The system of claim 7, wherein the system comprises a plurality of processing nodes that are coupled through a communication network.

15. The system of claim 14, wherein the system is a computer graphics system.

16. The system of claim 14, wherein the processing logic comprises work queues maintained among the processing nodes.

* * * * *

UNITED STATES PATENT AND TRADEMARK OFFICE
CERTIFICATE OF CORRECTION

PATENT NO. : 7,629,979 B2
APPLICATION NO. : 10/644215
DATED : December 8, 2009
INVENTOR(S) : Darel N. Emmot et al.

It is certified that error appears in the above-identified patent and that said Letters Patent is hereby corrected as shown below:

In column 6, line 49, in Claim 11, after "at the" delete "at the".

In column 6, line 57, in Claim 15, delete "claim 14," and insert -- claim 7, --, therefor.

Signed and Sealed this

Eighth Day of June, 2010

David J. Kappos
*Director of the United States Patent and Trademark Office*